United States Patent
Stilgenbauer et al.

(10) Patent No.: US 10,309,404 B2
(45) Date of Patent: Jun. 4, 2019

(54) EXHAUST-GAS TURBOCHARGER

(71) Applicant: BorgWarner Inc., Auburn Hills, MI (US)

(72) Inventors: Michael Stilgenbauer, Bolanden (DE); Gerald Schall, Bobenheim-Roxheim (DE); Rolf Sauerstein, Finkenbach-Gersweiler (DE); Roman Koenig, Rockenhausen (DE); Matthias Ruh, Offenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 159 days.

(21) Appl. No.: 14/778,629

(22) PCT Filed: Mar. 25, 2014

(86) PCT No.: PCT/US2014/031718
§ 371 (c)(1),
(2) Date: Sep. 21, 2015

(87) PCT Pub. No.: WO2014/165353
PCT Pub. Date: Oct. 9, 2014

(65) Prior Publication Data
US 2016/0040678 A1  Feb. 11, 2016

(30) Foreign Application Priority Data

Apr. 4, 2013  (DE) ......................... 10 2013 005 925

(51) Int. Cl.
*F02B 33/40* (2006.01)
*F02B 37/18* (2006.01)
(Continued)

(52) U.S. Cl.
CPC ............ *F04D 25/045* (2013.01); *F02B 33/40* (2013.01); *F02B 37/183* (2013.01);
(Continued)

(58) Field of Classification Search
CPC .............. F04D 13/043; F04D 15/0011; F04D 15/0245; F04D 15/0254; F04D 15/0281;
(Continued)

(56) References Cited

U.S. PATENT DOCUMENTS

| | | |
|---|---|---|
| 4,366,790 A | 1/1983 | Deboynton |
| 4,630,445 A | 12/1986 | Parker |

(Continued)

FOREIGN PATENT DOCUMENTS

| | | |
|---|---|---|
| CN | 102472158 A | 5/2012 |
| JP | 63141834 U | 9/1988 |

OTHER PUBLICATIONS

Chinese Office Action (with English language translation) dated Feb. 22, 2017, in Chinese Application No. 201480017678.9.
(Continued)

*Primary Examiner* — Alexander B Comley
(74) *Attorney, Agent, or Firm* — Eric L. Doyle; Stephan A. Pendorf; Patent Central LLC

(57) ABSTRACT

An exhaust-gas turbocharger (1) having a compressor (2) which has a compressor housing (3); a turbine (4) which has a turbine housing (5); and a compressor-side and/or turbine-side charge pressure regulating device (6) which has a shut-off element (7) which opens or closes a flow opening (9). The shut-off element (7) is in the form of a slide which is mounted on a guide (8) so as to be longitudinally displaceable along a longitudinal central line ($LM_8$) of the guide (8), and the flow opening (9) is arranged at least substantially at a right angle ($\alpha$) with respect to the longitudinal central line ($LM_8$) of the guide (8).

12 Claims, 3 Drawing Sheets

Figure 1:
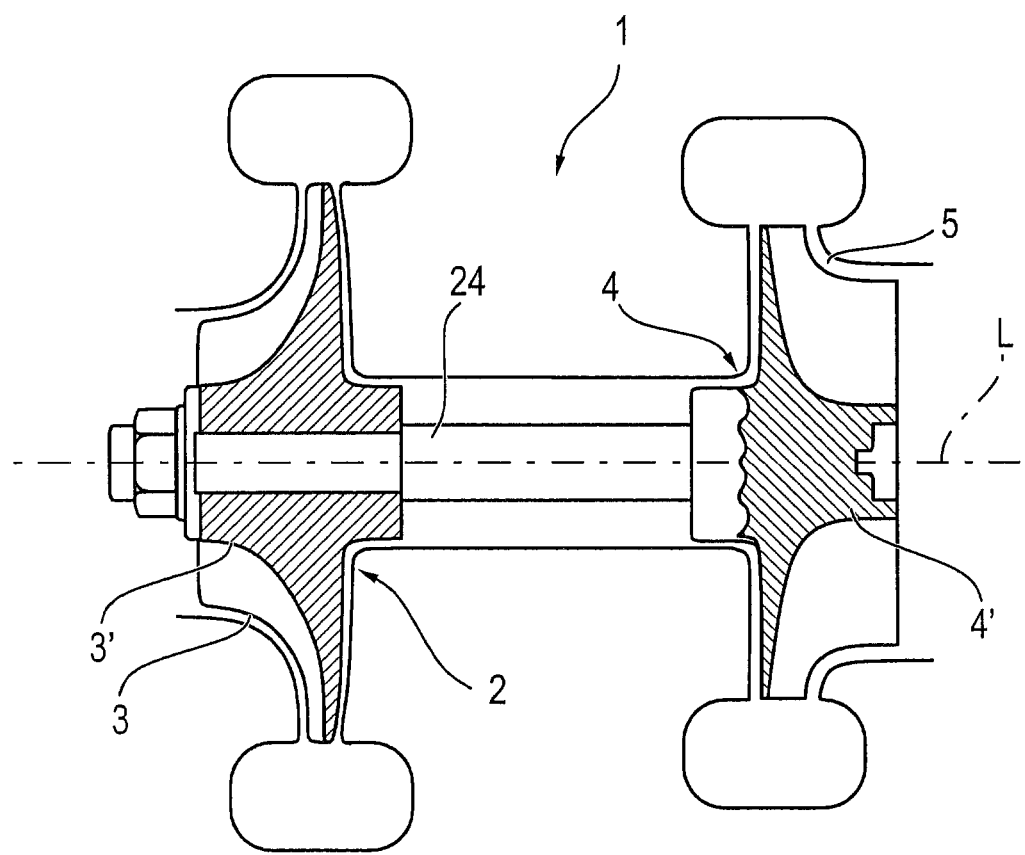

(51) Int. Cl.
*F04D 17/10* (2006.01)
*F04D 25/04* (2006.01)
*F04D 27/00* (2006.01)
*F04D 27/02* (2006.01)

(52) U.S. Cl.
CPC ....... *F04D 27/009* (2013.01); *F04D 27/0215* (2013.01); *F04D 17/10* (2013.01); *Y02T 10/144* (2013.01)

(58) Field of Classification Search
CPC .. F04D 25/045; F04D 27/009; F04D 27/0207; F04D 27/0215; F04D 27/0261; F01D 17/141; F02B 33/40; F02B 37/183
USPC .......... 415/145, 151, 157, 144; 60/600–603, 60/615; 417/406, 407; 137/625.3, 137/625.33, 625.37; 251/205
See application file for complete search history.

(56) References Cited

U.S. PATENT DOCUMENTS

| | | | |
|---|---|---|---|
| 4,918,923 A * | 4/1990 | Woollenweber | F01N 13/082 123/41.49 |
| 7,699,075 B2 * | 4/2010 | Bohaychuk | E21B 34/04 137/625.33 |
| 2006/0037317 A1 * | 2/2006 | Leavesley | F04D 25/04 60/602 |
| 2010/0251709 A1 | 10/2010 | Wirbeleit et al. | |
| 2010/0300090 A1 | 12/2010 | Kratschmer et al. | |
| 2012/0099965 A1 | 4/2012 | Ramb | |

OTHER PUBLICATIONS

Written Opinion and International Search Report in International Application No. PCT/US2014/031718, dated Jul. 18, 2014.
Chinese Office Action (with English language translation) dated Oct. 31, 2017, in Chinese Application No. 201480017678.9.
Japanese Office Action (with English language translation) dated Aug. 14, 2017, in Japanese Application No. 2016-506326.

\* cited by examiner

EXHAUST-GAS TURBOCHARGER

The invention relates to an exhaust-gas turbocharger according to the preamble of claim 1.

For charge pressure regulation, a generic exhaust-gas turbocharger may be equipped, at the compressor side, with a charge pressure regulating device in the form of a compressor bypass arrangement, and/or, at the turbine side, with a wastegate duct which connects the turbine inlet to the turbine outlet while bypassing the turbine wheel. When the required charge pressure is attained, at least a part of the exhaust-gas flow can be conducted past the turbine or past the turbine wheel through said wastegate or bypass duct. To open and close the wastegate duct, there is provided a wastegate flap which is also referred to as a charge pressure control flap. Said charge pressure control flap is connected via a linkage to an actuator which may for example be in the form of a pneumatic control capsule or electric actuating motor.

In the case of a charge pressure regulating device designed in this way, the exhaust gas impinges directly or frontally on the flat plate and leads to a high level of wear and noise generation, in particular in the case of Otto-cycle engines owing to the high pulsation loading.

It is therefore an object of the present invention to provide an exhaust-gas turbocharger of the type indicated in the preamble of claim 1 which is less susceptible to wear and the noise generation and adjustment forces of which can be minimized.

This object is achieved by the features of claim 1.

By virtue of the shut-off element of the charge pressure regulating device being configured as a slide, the technical problems explained in the introduction can be greatly alleviated, because the exhaust gas is not conducted directly onto the slide but rather is discharged at right angles to a regulating direction of the slide in which the slide is actuated by the actuator. The actuator that actuates the slide is accordingly not influenced by forces acting on the slide. Accordingly, no forces, or only negligible forces, caused by pulsation fluctuations act on the control capsule or the electric actuating motor.

This permits, owing to the diverted flow forces, a minimization of wear, of noise generation and of the adjustment forces.

The dependent claims contain advantageous developments of the invention.

The slide is actuated by means of suitable actuators such as an electric actuator, charge pressure regulating valve or control capsule.

According to the invention, it is possible here for a compressor-side and/or turbine-side charge pressure regulating device to be provided in accordance with the principles of the present invention.

Figure 2:
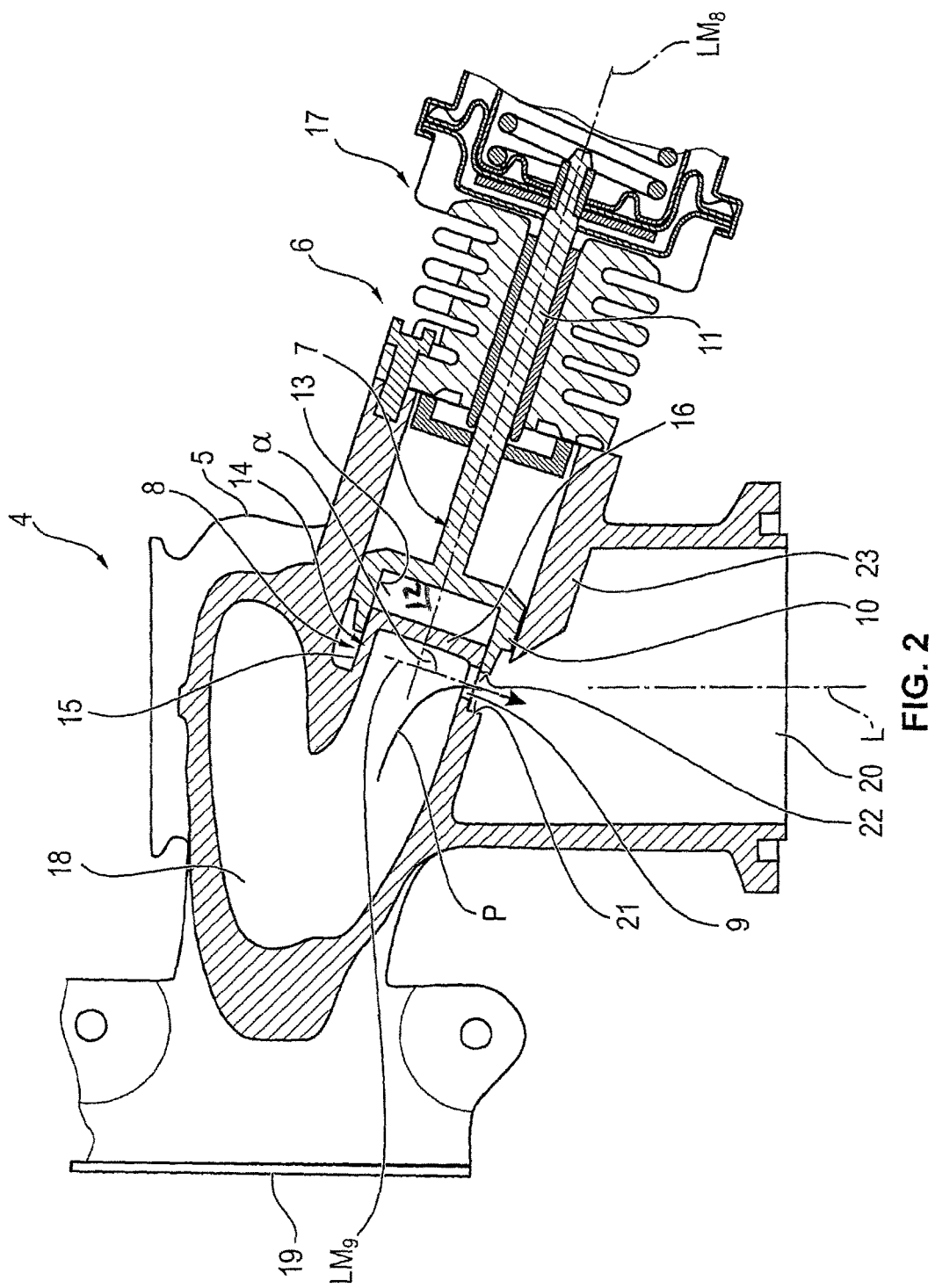
Figure 3:
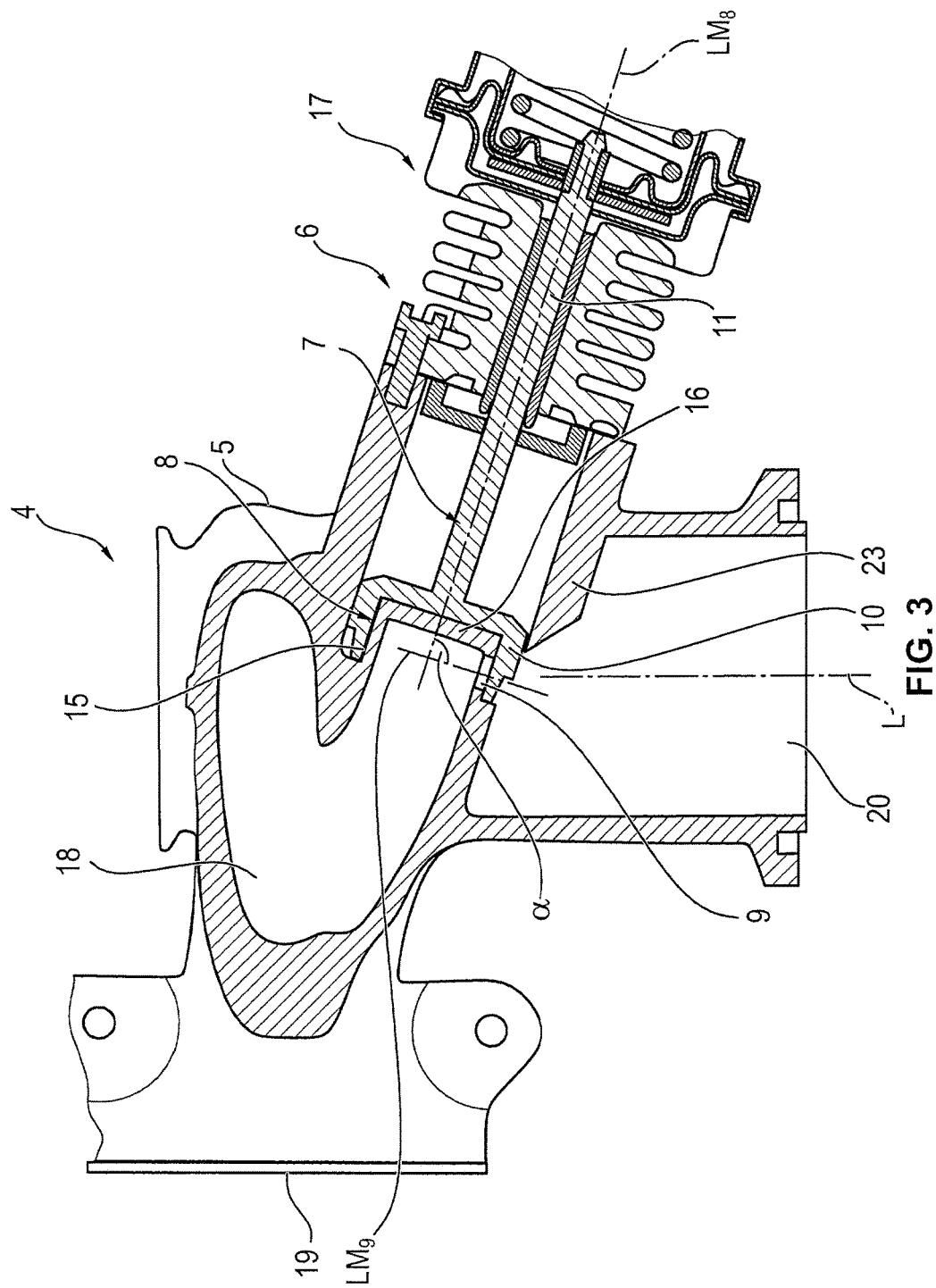

Further details, advantages and features of the present invention emerge from the following description of exemplary embodiments with reference to the drawing, in which:

FIG. 1 is a schematically highly simplified illustration of an exhaust-gas turbocharger according to the invention which is provided with a charge pressure regulating device according to the invention, FIG. 2 shows a sectional illustration through a turbine housing of a turbine of the exhaust-gas turbocharger as per FIG. 1 in an open position, and FIG. 3 shows the turbine or the turbine housing as per FIG. 2 in the closed position of a slide of a charge pressure regulating device which is provided, in this case, at the turbine side.

FIG. 1 is a schematically highly simplified illustration of an exhaust-gas turbocharger 1 according to the invention which has a compressor 2 with an associated compressor housing 3 in which a compressor wheel 3' is arranged.

Furthermore, the exhaust-gas turbocharger 1 has a turbine 4 with a turbine housing 5 in which a turbine wheel 4' is arranged, which turbine wheel is connected to the compressor wheel via a shaft 24.

An exhaust-gas turbocharger 1 of said type may be equipped, at the compressor side and/or at the turbine side, with a charge pressure regulating device 6, which will be described in detail below on the basis of FIGS. 2 and 3.

The charge pressure regulating device 6 has a shut-off element 7 which can open and close a flow opening 9.

As shown in FIGS. 2 and 3, the shut-off element 7 is in the form of a slide which is mounted and guided on a guide 8 so as to be longitudinally displaceable on the guide 8 along the longitudinal central line $LM_8$ of the guide 8.

Here, the flow opening 9 is arranged at an angle $\alpha$ with respect to the longitudinal central line $LM_8$ of the guide 8. Here, the angle $\alpha$ is bounded between the longitudinal central line $LM_8$ of the guide 8 and the longitudinal central line $LM_9$ of the flow opening 9. The angle $\alpha$ preferably has a value of 90°. Said value may however also be approximately 10° greater than or less than 90°.

As can be seen from a juxtaposition of FIGS. 2 and 3, the slide 7 has a slide head 10 which is connected to a slide rod 11.

The slide head 10 is of pot-shaped form and accordingly has an interior space 12, which is surrounded by a guide and seal wall 13.

The slide head 10 is arranged on a cylindrical guide spigot 14 of the guide 8. For this purpose, the guide spigot 14 has a cylindrical outer wall 15 which is provided with a face wall 16 which is arranged in the interior space 12 of the slide head 10. The advantage of this design can be seen in the fact that no gas forces act on the slide 7 along the axis $LM_8$.

Here, FIG. 2 shows the open position of the slide head 10 in which the slide 7, with its slide head 10, opens up the flow opening 9 such that a flow connection is created between a bypass duct 18, which is connected to a turbine housing inlet 19, and the turbine housing outlet 20, as indicated by the arrow P shown in FIG. 2.

Said flow connection is shut off if the slide 7 is displaced with its slide head 10 into the closed position shown in FIG. 3, in which the slide head 10 fully closes the flow opening 9, which is preferably in the form of a partially encircling flow opening. Said displacement or movement into the closed position illustrated in FIG. 3 is effected by means of an actuator 17 that actuates the slide rod 11. Reference signs 21 and 22 in FIG. 2 indicate those sealing surfaces of the turbine housing 5 and of the slide head 10 which are active in the closed position in FIG. 3.

FIGS. 2 and 3 also show that, for the guidance of the slide head 10 and thus of the slide 7, a guide sleeve 23 is provided, preferably as an integral constituent part of the turbine housing 5, along which guide sleeve the slide head 10 is longitudinally movable between its closed position and its open position.

The guide spigot 14 that is also provided is preferably formed in one piece with the turbine housing 5, as can be seen from the diagrammatic illustration in FIGS. 2 and 3.

The advantage of this design can be seen in the fact that guidance and centering of the slide 7 is ensured over the entire displacement travel, wherein said single-piece embodiment of the guide spigot 14 and of the guide sleeve 23 with the turbine housing 5 results in inexpensive production.

In addition to the above written disclosure of the invention, reference is hereby explicitly made, for additional disclosure thereof, to the diagrammatic illustration of the invention in FIGS. 1 to 3.

LIST OF REFERENCE SIGNS

1 Exhaust-gas turbocharger
2 Compressor
3 Compressor housing
3' Compressor wheel
4 Turbine
4' Turbine wheel
5 Turbine housing
6 Charge pressure regulating device
7 Shut-off element
8 Guide
9 Flow opening
10 Slide head
11 Slide rod
12 Interior space
13 Guide and seal wall
14 Guide spigot
15 Outer wall
16 Face wall
17 Actuator
18 Bypass duct
19 Turbine housing inlet
20 Turbine housing outlet
21, 22 Sealing surfaces
23 Guide sleeve
24 Shaft
$LM_8$ Longitudinal central line of the guide 8
$LM_9$ Longitudinal central line of the flow opening 9
L Charger axis
α Angle

The invention claimed is:

1. An exhaust-gas turbocharger (1), having a compressor (2) which has a compressor housing (3) housing a compressor wheel (3'); a turbine (4) which has a turbine housing (5) housing a turbine wheel (4'), the compressor wheel (3') connected to the turbine wheel (4') via a shaft (24) having an axis of rotation (L); a bypass duct connected to a turbine housing inlet (19) or a compressor housing outlet comprising a cylindrical guide spigot (14); and a compressor-side or turbine-side charge pressure regulating device (6) which has a shut-off element (7) which opens or closes a flow opening (9) in said cylindrical guide spigot (14), wherein the shut-off element (7) is in the form of a slide head (10) which is mounted on a guide (8) formed by a cylindrical outer wall (15) of said cylindrical guide spigot (14) so as to be longitudinally displaceable along a longitudinal central line ($LM_s$) of the guide (8) between a closed position and an open position, the flow opening (9) partially encircling said cylindrical outer wall (15) of said cylindrical guide spigot (14) and being arranged at least substantially at a right angle with respect to the longitudinal central line ($LM_s$) of the guide (8), wherein the cylindrical guide spigot (14) has a face wall (16) that adjoins and closes off an end of the cylindrical outer wall (15), wherein the charge pressure regulating device (6) is (a) a wastegate arrangement of the turbine housing (5) wherein the shut-off element opens or closes a bypass of the turbine (4) or (b) a compressor bypass arrangement of the compressor housing (3) wherein the shut-off element opens or closes the compressor bypass arrangement of the compressor housing (3), and the slide head (10) is connected to a slide rod (11), and the slide head (10) is pot-shaped with a cylindrical guide and seal wall (13), and wherein the longitudinal central line ($LM_8$) of displacement of the guide (8) is offset from the axis of rotation (L).

2. The exhaust-gas turbocharger as claimed in claim 1, wherein the outer wall (15) guides the slide head (10) by way of the guide and seal wall (13).

3. The exhaust-gas turbocharger as claimed in claim 1, wherein the slide head (10) is movable between the closed position, in which it closes the flow opening (9), and the open position, in which it opens up the flow opening (9).

4. The exhaust-gas turbocharger as claimed in claim 1, wherein the shut-off element (7) is actuated by an actuator (17).

5. The exhaust-gas turbocharger as claimed in claim 1, wherein the charge pressure regulating device (6) is a wastegate arrangement of the turbine housing (5) of the turbine (4).

6. The exhaust-gas turbocharger as claimed in claim 5, wherein the shut-off element (7) is guided in the turbine housing (5) via a guide sleeve (3).

7. The exhaust-gas turbocharger as claimed in claim 1, wherein the charge pressure regulating device (6) is a compressor bypass arrangement.

8. The exhaust-gas turbocharger as claimed in claim 1, wherein the slide head (10) and the slide rod (11) are formed in one piece.

9. The exhaust-gas turbocharger as claimed in claim 1, wherein the guide spigot (14) and the turbine housing (5) are formed in one piece.

10. The exhaust-gas turbocharger as claimed in claim 1, wherein the longitudinal central line ($LM_8$) of displacement of the guide (8) is at an angle to the axis of rotation (L) of the shaft (24).

11. An exhaust-gas turbocharger (1), having a compressor (2) which has a compressor housing (3) housing a compressor wheel (3'); a turbine (4) which has a turbine housing (5) housing a turbine wheel (4'), the compressor wheel (3') connected to the turbine wheel (4') via a shaft (24) having an axis of rotation (L); a bypass duct connected to a turbine housing inlet (19) or a compressor housing outlet comprising a cylindrical guide spigot (14); and a compressor-side or turbine-side charge pressure regulating device (6) which has a shut-off element (7) which opens or closes a flow opening (9), wherein the shut-off element (7) is in the form of a slide head (10) which is mounted on a guide (8) formed by a cylindrical outer wall (15) of said cylindrical guide spigot (14) so as to be longitudinally displaceable along a longitudinal central line ($LM_8$) of the guide (8) between a closed position and an open position, and the flow opening (9) partially encircling said cylindrical outer wall (15) of said cylindrical guide spigot (14) and being arranged at least substantially at a right angle (a) with respect to the longitudinal central line (LMs) of the guide (8), the slide head (10) is pot-shaped with a cylindrical guide and seal wall (13) that points into an interior space (12), the cylindrical guide spigot (14) has a face wall (16) that adjoins and closes off an end of the cylindrical outer wall (15), the flow opening (9) is arranged in the cylindrical outer wall (15) of the cylindrical guide spigot (14), and the longitudinal central line ($LM_8$) of displacement of the guide (8) is offset from the axis of rotation (L) of the shaft (24).

12. The exhaust-gas turbocharger as claimed in claim 11, wherein the longitudinal central line ($LM_8$) of displacement of the guide (8) is at an angle to the axis of rotation (L) of the shaft (24).

\* \* \* \* \*